UNITED STATES PATENT OFFICE.

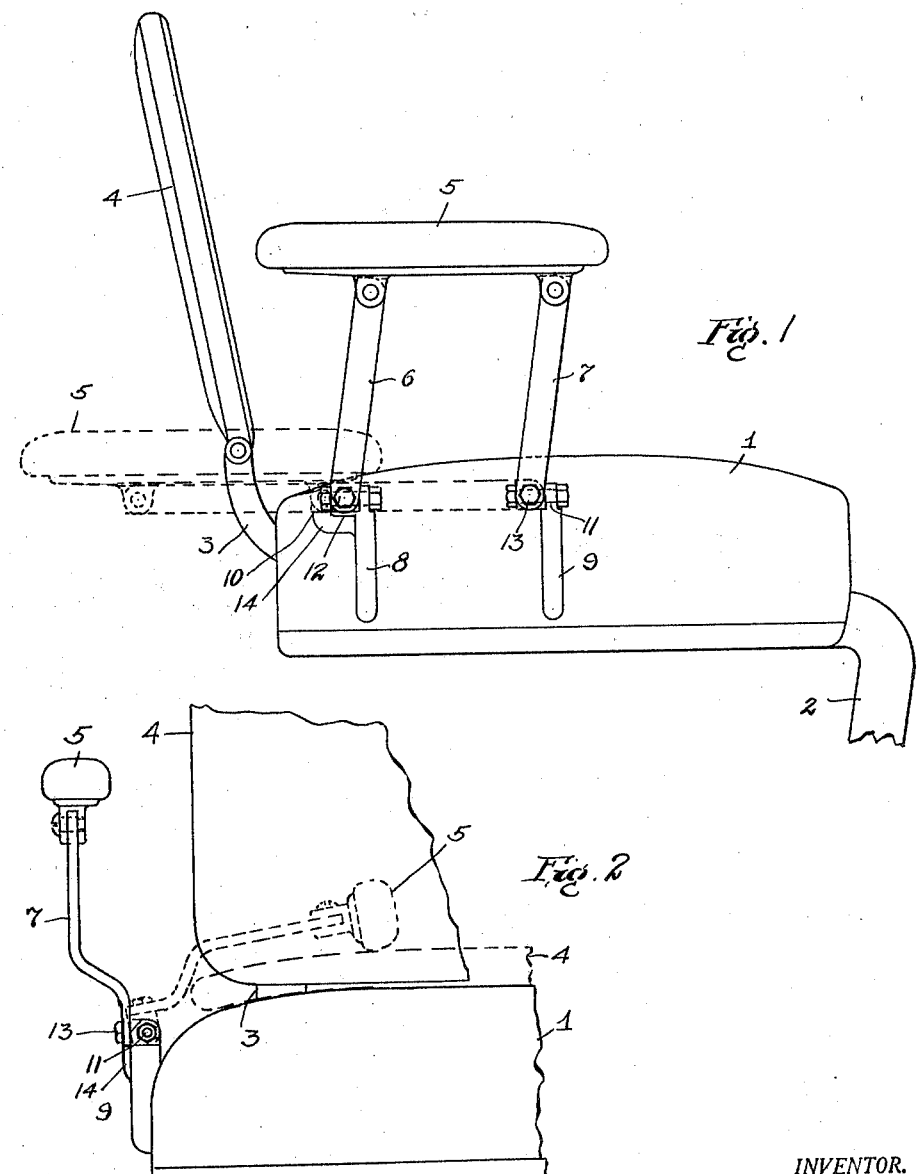

JOHN P. BROPHY, OF CLEVELAND, OHIO.

FOLDING ARMREST.

1,399,744. Specification of Letters Patent. Patented Dec. 13, 1921.

Application filed September 1, 1921. Serial No. 497,534.

*To all whom it may concern:*

Be it known that I, JOHN P. BROPHY, a citizen of the United States, and a resident of Cleveland, county of Cuyahoga, and State of Ohio, have invented a new and useful Improvement in Folding Armrests, of which the following is a specification, the principle of the invention being herein explained and the best mode in which I have contemplated applying that principle, so as to distinguish it from other inventions.

The present improved arm rest is more particularly designed for use in connection with folding seats, such as are used on automobiles, more especially in the case of closed bodies of the coupé or close-coupled type, where it is the practice to provide a folding seat adjacent the driver's seat which drops down into a recess beneath the instrument board so as to clear the entrance for the driver or for passengers to the rear seat. While the arm rests, with which such folding seat is ordinarily provided, along with the back of the seat, are arranged to fold against the seat proper in order to permit the latter to be thus disposed out of the way, when the seat is raised the arm rest on the outer side, *i. e.*, adjacent the door, stands in the way of the passenger taking such folding seat in most inconvenient fashion. The object of the present invention, accordingly, is the provision of an arm rest that may not only be folded on to the seat in the fashion just referred to when the seat is not in use, but that may be dropped out of the way and then raised so as not to interfere with the use of the seat by a passenger.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 1 is a broken side elevation of a seat of the character described, showing my improved folding arm-rest applied thereto; and Fig. 2 is a broken front elevation of the same.

The seat 1 illustrated is one particularly designed, as described above, for use in a body of the coupé type, being carried by a support 2 that is pivotally attached to the floor of the car body so as to be capable of dropping forwardly into an approximately horizontal position, and thereby bring the seat into an approximately vertical position, when the latter is not in use. Pivotally attached to brackets 3 at the rear of the seat is a folding back 4 that, when the seat is not in use, drops down upon the latter, as indicated in dotted outline in Fig. 2. The arm rest 5 of present interest, as heretofore constructed, has been pivotally attached to the side of the seat on an axis at approximately right angles to that of said back so that when the latter is thus dropped down the arm rest may be folded on top of it. Obviously, however, such arm rest will either stand up in the way of the passenger entering the seat, or, if folded down in front of the back, difficulty is presented in raising it again after the passenger has entered.

In my present improved construction such arm rest 5 is pivotally attached to the upper ends of two pivotal bars 6 and 7, that are in turn pivotally attached at their lower ends to brackets 8 and 9, respectively, that project laterally from the seat. The pivotal connection of the bars with such brackets is about two axes, one, provided by pins 10 and 11, being about an axis parallel with the side of the seat, while the other, provided by pins 12 and 13, is about an axis at right angles to such first-mentioned axes. The brackets 8 and 9 serve as stops to engage with the bars 6 and 7 in the raised position of the latter, as shown in Fig. 1, so as to hold the same inclined slightly from the vertical, thus preventing accidental dropping of the rest into the folded position illustrated in dotted outline in Fig. 1. However, if a passenger desires to enter the seat the rest 5 is simply moved into the dotted position, where it is entirely out of the way. A supplemental stop 14 on bracket 8 is preferably provided to hold the seat in the position last referred to, although it may be allowed to drop into depending vertical position if desired. When the seat as a whole is to be folded up and dropped out of the way the arm rest 5 will fold over the top of the back 4 just as in the present construction.

It will be evident from the foregoing description that my improved folding arm rest provides an adjunct of superior convenience and yet simple construction. It will be understood of course that the use of such a folding arm rest is not limited to the particular kind of folding seat referred to, or, for that matter, to a folding seat at all, but may find general employment in connection with seats where the space, through which the same may be entered, is limited.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. The combination with a seat, of an arm rest therefor, said rest being foldable both in a transverse direction onto said seat and in a longitudinal direction to clear the latter, substantially as described.

2. The combination with a seat, of an arm rest therefor, and a support connecting said rest with said seat, said support being pivotally attached to said rest and seat about axes transverse of the latter and being, in addition, pivotal about an axis extending longitudinally of said seat.

3. The combination with a seat, of an arm rest therefor, and plural supporting bars connecting said rest with said seat, said bars being pivotally attached at longitudinally spaced points to said rest and seat about axes transverse of the latter and being, in addition, pivotal about an axis extending longitudinally of said seat.

4. The combination with a seat, of an arm rest therefor, two supporting bars connecting said rest with said seat, said bars being pivotally attached at longitudinally spaced points to said rest and seat about axes transverse of the latter and being, in addition, pivotal about an axis extending longitudinally of said seat, and stops limiting the movement of said bars about such transverse axes.

Signed by me, this 29 day of August, 1921.

JOHN P. BROPHY.